(12) United States Patent
Bleeck et al.

(10) Patent No.: US 12,486,820 B2
(45) Date of Patent: Dec. 2, 2025

(54) DEVICE FOR THE CONTROLLABLE METERING OF HYDROGEN AND METHOD FOR THE PRODUCTION THEREOF

(71) Applicant: Vitesco Technologies GmbH, Regensburg (DE)

(72) Inventors: Matthias Bleeck, Pentling (DE); Uwe Nigrin, Ilmenau (DE); Florian Braun, Roding (DE); Henry Meißgeier, Roding (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/548,919

(22) PCT Filed: Mar. 1, 2022

(86) PCT No.: PCT/EP2022/055142
§ 371 (c)(1),
(2) Date: Sep. 4, 2023

(87) PCT Pub. No.: WO2022/184707
PCT Pub. Date: Sep. 9, 2022

(65) Prior Publication Data
US 2024/0141853 A1 May 2, 2024

(30) Foreign Application Priority Data

Mar. 4, 2021 (DE) ...................... 10 2021 202 117.4

(51) Int. Cl.
*F02M 21/02* (2006.01)
*F02D 19/02* (2006.01)
(Continued)

(52) U.S. Cl.
CPC ....... *F02M 21/0233* (2013.01); *F02D 19/023* (2013.01); *F02M 21/0206* (2013.01);
(Continued)

(58) Field of Classification Search
CPC ............ F02M 21/0233; F02M 21/0206; F02D 19/023; F16K 31/0655; F16K 31/0675;
(Continued)

(56) References Cited

U.S. PATENT DOCUMENTS 2,407,603 A * 9/1946 Derungs .................... H01F 7/13
335/177
3,168,242 A * 2/1965 Diener .................... G05D 23/24
236/78 D (Continued)

FOREIGN PATENT DOCUMENTS

| DE | 10 2016 224273 | 6/2018 | ............. F16K 31/06 |
| JP | S60 241 586 | 11/1985 | ............. F16K 31/06 |
| WO | 2009 106080 | 9/2009 | ............... H01F 7/08 |

OTHER PUBLICATIONS

Search Report for International Application No. PCT/EP2022/055142, 10 pages, Jun. 28, 2022.
(Continued)

*Primary Examiner* — John Bastianelli
(74) *Attorney, Agent, or Firm* — Slayden Grubert Beard PLLC

(57) ABSTRACT

A device for the feedback-controllable metering of hydrogen may include: a valve seat; a sealing element; and an electromagnetic actuator having a pole core, a solenoid, and an armature coupled to the sealing element. The actuator moves the sealing element along an axis as a function of an electric current in the solenoid. A surface of the pole core and a surface of the armature conjointly form a double cone.

9 Claims, 3 Drawing Sheets

(51) Int. Cl.
*F16K 31/06* (2006.01)
*H01M 8/04082* (2016.01)
*H01M 8/04746* (2016.01)

(52) U.S. Cl.
CPC ...... *F16K 31/0655* (2013.01); *F16K 31/0675* (2013.01); *H01M 8/04201* (2013.01); *H01M 8/04753* (2013.01)

(58) Field of Classification Search
CPC . H01M 8/04201; H01M 8/04753; H01F 7/08; H01F 7/081; H01F 2007/086
USPC ..................... 251/129.15; 335/261, 279, 281
See application file for complete search history.

(56) References Cited

U.S. PATENT DOCUMENTS

| | | | | |
|---|---|---|---|---|
| 3,381,250 | A * | 4/1968 | Weathers | H01F 7/13 335/262 |
| 3,791,408 | A * | 2/1974 | Saitou | F16K 31/0689 251/129.15 |
| 5,295,656 | A * | 3/1994 | Campbell | F25B 41/34 251/129.08 |
| 5,402,093 | A * | 3/1995 | Gibas | H01F 7/081 335/262 |
| 5,503,366 | A * | 4/1996 | Zabeck | F16K 31/0627 335/258 |
| 5,992,822 | A * | 11/1999 | Nakao | F16K 31/0655 335/262 |
| 6,189,519 | B1 * | 2/2001 | Press | F16K 47/04 123/568.21 |
| 6,619,612 | B2 * | 9/2003 | Freisinger | F16K 31/404 251/30.03 |
| 7,626,288 | B2 * | 12/2009 | Protze | H01F 7/1607 335/279 |
| 7,808,134 | B2 * | 10/2010 | Burnett | F16F 13/264 310/23 |
| 2004/0257185 | A1 | 12/2004 | Telep | 335/220 |
| 2005/0046531 | A1 * | 3/2005 | Moyer | F01L 9/20 335/256 |
| 2006/0208563 | A1 * | 9/2006 | Krawczyk | F16K 31/0665 303/119.2 |
| 2009/0026396 | A1 | 1/2009 | Moenkhaus | 251/129.02 |
| 2010/0327202 | A1 | 12/2010 | Birkelund | 251/129.15 |
| 2011/0049405 | A1 * | 3/2011 | Bill | H01F 7/1607 251/129.15 |
| 2011/0147629 | A1 * | 6/2011 | Gruen | H01F 7/13 335/262 |

OTHER PUBLICATIONS

Office Action for DE Application No. 10 2021 202 117.4, 6 pages, Nov. 11, 2021.

* cited by examiner

DEVICE FOR THE CONTROLLABLE METERING OF HYDROGEN AND METHOD FOR THE PRODUCTION THEREOF

CROSS-REFERENCE TO RELATED APPLICATIONS

This application is a U.S. National Stage Application of International Application No. PCT/EP2022/055142 filed Mar. 1, 2022, which designates the United States of America, and claims priority to DE Application No. 10 2021 202 117.4 filed Mar. 4, 2021, the contents of which are hereby incorporated by reference in their entirety.

TECHNICAL FIELD

The present disclosure relates to hydrogen and fuel cells in conjunction with vehicle engines. Various embodiments of the teachings herein include devices, systems, and/or methods for the feedback-controllable metering of hydrogen, for example into a hydrogen combustion engine (hereinafter referred to as "hydrogen engine") or to a fuel cell.

SUMMARY

The present disclosure is generally based on the object of providing a precise, efficient and safe feedback-control of the hydrogen supply in hydrogen engines or to fuel cells, and in particular to achieve a large control range for a purposefully accurate hydrogen metering while at the same time achieving a high minimum quantity quality. For example, some embodiments include a device for the feedback-controllable metering of hydrogen, in particular into a hydrogen engine or to a fuel cell, the device comprising: a valve seat (5); a sealing element (17); and an electromagnetic actuator having a pole core (11), a solenoid (2) and an armature (16) coupled to the sealing element (17), the actuator being configured to move the sealing element (17) along an axis (A) as a function of an electric current in the solenoid (2); wherein a surface of the pole core (11) and a surface of the armature (16) conjointly form a double cone.

In some embodiments, the surface of the pole core (11) has at least one first pole core surface region (111) having a first pole core cone angle, and a second pole core surface region (112) having a second pole core cone angle, and wherein the surface of the armature (16) has at least one first armature surface region (161) having a first armature cone angle, and a second armature surface region (162) having a second armature cone angle.

In some embodiments, the first pole core surface region (111) and the first armature surface region (161) are in each case closer to the sealing element (17) than the second pole core surface region (112) and the second armature surface region (162); and wherein the first pole core cone angle and the first armature cone angle are in each case smaller than the second pole core cone angle and the second armature cone angle.

In some embodiments, the first pole core cone angle is equal to the first armature cone angle, and/or wherein the second pole core cone angle is equal to the second armature cone angle.

In some embodiments, the device further includes a pin attached in the armature for centering a compression spring and/or anti-adhesive disk attached between the armature and the pole core.

In some embodiments, the device further comprises a circuit for energizing the solenoid, wherein the circuit comprises a pulse width modulator with a variable frequency which is configured for varying the frequency as a function of voltage, duty cycle of the pulse width modulator, and the coil current.

In some embodiments, the sealing element (17) has a surface which tapers axially in the direction of the valve seat and which has at least two portions (171, 172) each having a different angle of inclination relative to the axis (A).

In some embodiments, the device further comprises a characteristic curve representing a correlation between mass flow and coil current, which has at least two linear portions (K1, K2, K3) each with a different gradient.

In some embodiments, the electromagnetic actuator is disposed on a high-pressure side of the device.

As another example, some embodiments include a method for producing a device for the feedback-controllable metering of hydrogen, in particular into a hydrogen engine or to a fuel cell, the method comprising: providing a valve seat; providing a sealing element; and providing an electromagnetic actuator with a pole core, a solenoid, and an armature coupled to the sealing element, wherein the actuator is configured to move the sealing element along an axis as a function of an electric current in the solenoid; wherein a surface of the pole core and a surface of the armature conjointly form a double cone.

BRIEF DESCRIPTION OF THE DRAWINGS

Further advantages and features of the teachings of the present disclosure are derived from the following exemplary description.

In the figures.

Figure 1:
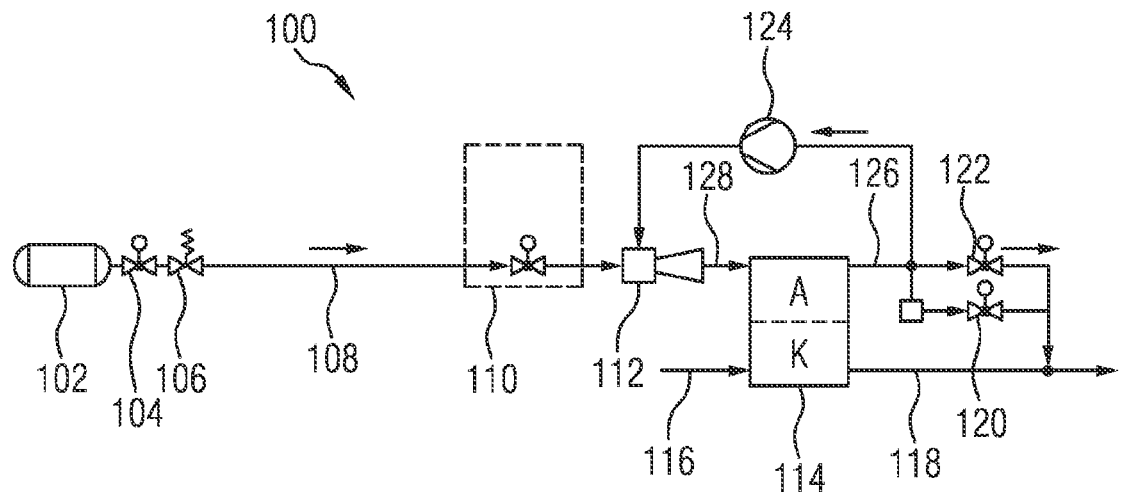
FIG. 1 shows an example system for supplying hydrogen to a fuel cell.

It should be noted that the embodiments described below represent merely a limited selection of potential variants.

DETAILED DESCRIPTION

Some embodiments of the teachings herein include a device for the feedback-controllable metering of hydrogen. For example, this is a device for the feedback-controllable metering of hydrogen to a fuel cell, in particular in a vehicle with electric drive. In some embodiments, this is a device for the feedback-controllable metering of hydrogen into a hydrogen engine, in particular for the injection of hydrogen into an induction pipe or a combustion chamber of the hydrogen engine. In one refinement, the hydrogen engine is a motor vehicle hydrogen engine.

In some embodiments, the device has: (a) a valve seat, (b) a sealing element, and (c) an electromagnetic actuator having a pole core, a solenoid, and an armature coupled to the sealing element, wherein the actuator is configured to move the sealing element along an axis as a function of an electric current in the solenoid, wherein a surface of the pole core and a surface of the armature conjointly form a double cone.

The use of a double cone in the electromagnetic actuator provides a largely linearized actuator, which has good feedback-controllability over a relatively large working range. The term "double cone" is understood in such a way that both the surface of the pole core and the surface of the armature each have a conical shape. The two cone surfaces are particularly designed so that the cone surface of the pole core fits into the cone surface of the armature.

In some embodiments, the surface of the pole core has at least one first pole core surface region with a first pole core cone angle and a second pole core surface region with a second pole core cone angle, and the surface of the armature has at least a first armature surface region with a first armature cone angle and a second armature surface region with a second armature cone angle. In this context, the term "cone angle" refers in particular to the angle between the axis and the cone surface.

In other words, both the pole core cone and the armature cone each have two surface regions with different cone angles. Depending on the stroke of the magnet, the magnetic field lines are deflected differently for linearization. This allows the characteristic curve (the correlation between mass flow and electrical coil current) to be shaped in such a way that the feedback-control accuracy (gradient of the characteristic curve) is adapted to the requirements of the fuel cell or the hydrogen engine. In particular, a corresponding segmentation of the characteristic curve can be achieved by a gradation of the cone faces.

In some embodiments, the first pole core surface region and the first armature surface region are in each case closer to the sealing element than the second pole core surface region and the second armature surface region, and the first pole core cone angle and the first armature cone angle are in each case smaller than the second pole core cone angle and the second armature cone angle. In other words, the first pole core surface region and the first armature surface region are steeper than the second pole core surface region and the second armature surface region. This leads in particular to a flatter characteristic curve for smaller valve openings than for larger valve openings and thus allows a more precise feedback-control of the hydrogen supply when the valve is opened and shortly after it is opened.

In some embodiments, the first pole core cone angle is equal to the first armature cone angle, and/or the second pole core cone angle is equal to the second armature cone angle. In other words, the conical shape of the pole core largely corresponds to the conical shape of the armature.

In some embodiments, the device further comprises a pin attached in the armature for centering a pressure spring and/or anti-adhesive disk attached between the armature and the pole core. The pin attached in the armature can perform several functions. In particular, the pin can center a compression spring and/or an anti-adhesive disk and provide a reliable positional definition (so that undercuts are not required, since both components bear in a planar manner). In addition, magnetic or non-magnetic properties can influence the characteristic curve of the device in a targeted manner. In addition, ease of manufacturing is provided by the disposal in the armature.

In the area of magnetic force generation, the armature is pulled into the opposite pole core by way of a cone. A non-magnetic anti-adhesive disk can be incorporated so as to define the final force of the feedback-control range in the region of magnetic force generation. The initial force of the magnet is achieved by setting the particularly large armature stroke in the region of magnetic force generation.

In some embodiments, the device furthermore comprises a circuit for energizing the magnetic coil, wherein the circuit comprises a pulse width modulator with a variable frequency, which is configured for varying the frequency as a function of voltage, duty cycle of the pulse width modulator, and the coil current. The purpose of varying the frequency is in particular to adjust the movement of the magnet and thus of the pin, so that the movement of the magnet is smaller than the stroke of the valve. This can prevent bouncing, which can occur in the opening region, because the pneumatic stroke can be small and the movement of the armature can be larger than the pneumatic stroke.

In some embodiments, the sealing element has a surface which tapers axially in the direction of the valve seat and which has at least two portions each having a different angle of inclination relative to the axis. The design of the sealing element with at least two surface portions with an individual inclination angle enables precise and demand-oriented feedback-control of the volumetric flow of hydrogen. The angle of inclination determines directly the correlation between the change in effective valve opening and the change in armature stroke. The greater the angle of inclination, the smaller the change in the effective valve opening when the armature stroke changes. The sealing element formed in this way thus enables in particular different ratios between effective valve opening and armature movement in different operating states, such as, for example, when the valve is opening/closing, on the one hand, and when the valve is open, on the other hand.

In some embodiments, the first portion is closer to the valve seat than the second portion and has a smaller angle of inclination than the second portion. In other words, the angle of inclination of the second portion determines the effective valve opening when the valve is opening or shortly after it is opened, while the angle of inclination determines the effective valve opening when the valve is open.

In some embodiments, the tapered surface has a third portion having a third angle of inclination relative to the axis. By adding a third portion with a third angle of inclination, the correlation between change in effective valve opening and armature movement can be designed to a greater extent.

Additional portions with corresponding angles of inclination can be added if required.

In some embodiments, the device has a characteristic curve representing a correlation between mass flow and coil current, which has at least two linear portions each with a different gradient. The two linear portions of the characteristic curve correspond in each case in particular to the first and the second portion of the surface of the sealing element. For more than two surface portions with individual inclination angles, the characteristic curve will have correspondingly more linear portions with an individual gradient.

In some embodiments, the electromagnetic actuator is disposed on a high-pressure side of the device. This arrangement ensures that the actuator is in the region of the dry hydrogen and is therefore well protected against ice formation that may occur on the low pressure side.

Some embodiments include a method for producing a device for the feedback-controllable metering of hydrogen, in particular for producing a device for the feedback-controllable metering of hydrogen to a fuel cell or a device for the feedback-controllable metering of hydrogen into a hydrogen engine. In some embodiments, the method comprises the following steps: (a) providing a valve seat, (b)

providing a sealing element, and (c) providing an electromagnetic actuator having a polarity core, a solenoid, and an armature coupled to the sealing element, the actuator being configured to move the sealing element along an axis as a function of an electric current in the solenoid, wherein a surface of the pole core and a surface of the armature conjointly form a double cone.

It should be noted that various embodiments of the invention have been described with reference to different types of subject matter of the disclosure. In particular, some embodiments of the invention are described by way of methods and other are described by way of devices. However, the skilled person will immediately realize when reading this disclosure that, unless explicitly stated otherwise, in addition to a combination of features associated with one type of subject matter, any combination of features associated with different types of subject-matter of the is also possible.

Figure 2:
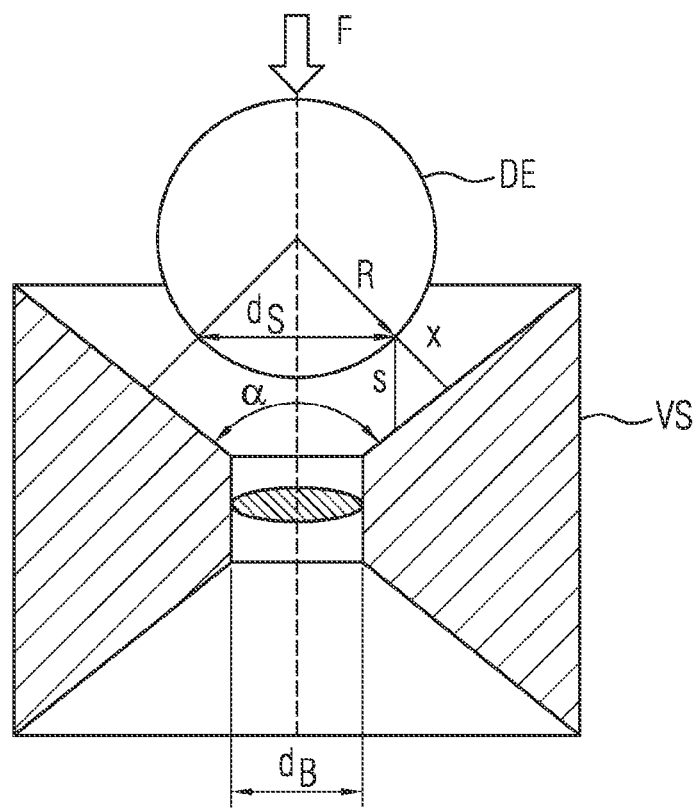
FIG. 2 shows a diagram of an example valve.
Figure 3:
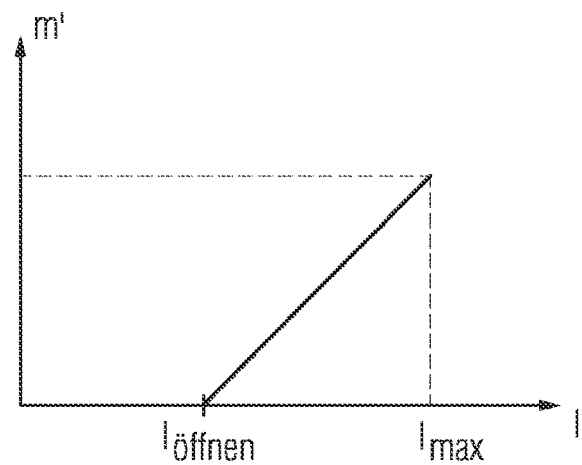
FIG. 3 shows a characteristic curve of an example valve.

First, with reference to FIGS. 1 to 3, a system for supplying hydrogen to a fuel cell, and in particular the requirements of such a system with regard to feedback-control, will be explained. FIG. 1 shows a system 100 for supplying hydrogen to a fuel cell. When fuel cells 114 are used, hydrogen from the hydrogen tank 102 is provided in gaseous form with a pressure of approx. 350 bar to 700 bar for the application. In order to prevent uncontrolled leakage in the event of a fault, a shut-off valve 104 is disposed directly after the tank 102. In the further course, the high pressure from the tank 102 is reduced by means of a pressure reducer 106 to a lower pressure stage, i.e. the range of the mean pressure, with approx. 10 bar to 30 bar. Within this pressure stage, the hydrogen in lines 108 is supplied to the region of the hydrogen metering, i.e. to the anode A of the fuel cell 114.

The targeted metering of hydrogen is performed by the valve 110 for the hydrogen metering. The pressure (low pressure) inside anode A is in the range of approx. 0.8 bar to 4 bar. With the pressure gradient from medium pressure to low pressure, a hydrogen mass flow is set in valve 110. The feedback-control of the pressure in anode A, which is a closed volume, is initially carried out in such a way that this volume is filled via a defined mass flow of hydrogen. A defined pressure is set in the volume of the region of the anode A.

The hydrogen in the fuel cell 114 reacts with the oxygen from the cathode side K. The oxygen in the cathode side K is supplied via the separate supply unit 116, which ensures that there is in this region sufficient oxygen available at a defined pressure in the region of the cathode K. An excess of oxygen can escape or be discharged via the outlet 118.

Over time, nitrogen and water diffuses through the membrane from the cathode side K to the anode side A. These block the channels of the hydrogen path and thus prevent the uniform distribution of the hydrogen over the entire membrane. To prevent this, the gas is recirculated within the anode region A. This can be performed by a gas blower 124 or an ejector 112. In the process, the gas from the outlet 126 of the anode A of the fuel cell 114 is supplied back to the inlet 128 of the anode A. This results in a gas exchange within the anode A. Unused hydrogen, nitrogen and water are thus pumped out of the stack and re-supplied to the latter.

The proportion of nitrogen and water in the hydrogen path increases as a result of the recirculation. Water can be separated by a water separator 120 during recirculation. Nitrogen is separated by actuating the flushing valve 122. By metering new hydrogen, the valve 110 keeps the pressure difference between the anode and cathode sides constant during the flushing process.

To feedback-control this pressure difference, the pressure on the anode and cathode side is measured by sensors. Via a feedback-control algorithm, the electronic control adjusts the hydrogen metering valve 110 in a targeted manner such that the pressure in the anode A is feedback-controlled in the defined range and the required pressure difference between the anode A and the cathode K is present for the reaction of the two gases.

The requirements for such a hydrogen metering valve 110 are as follows, all requirements applying simultaneously:
1. Feedback-control and control of hydrogen in the widest possible control range.
2. High feedback-control quality in the main operating ranges of the fuel cell 114.
3. High feedback-control quality for smallest quantities.
4. No noise generation.
5. Closed when de-energized: If the control signal is interrupted, the valve 110 should be closed
6. Protection of the membrane on the anode side A in case of overpressure in the inlet area of the hydrogen metering valve 110.
7. Feedback-controllability in the cold-starting range.
8. No damage to the magnet due to freezing water.
9. The magnet is tight in relation to the environment—no external leakage.

Volume flow feedback-control valves or rather, for fuel cell technology, mass flow feedback-control valves for supplying the anode A and feedback-controlling the anode pressure are valves in which a cross section is closed or released via a directly actuated magnet. The objective of the function is to meet the first three requirements mentioned above (large feedback-control range, high feedback-control quality in main operating ranges and for smallest quantities).

The main element in terms of dimensioning are the pneumatics with the valve seat and the sealing element. Illustrated in FIG. 2 are the geometric proportions of a pneumatic region.

With regard to the design of the valve, a cross section should assume the following states:
No cross-sectional release—the valve should seal—the stroke of the sealing element
continuous mass flow—a defined cross section should be available via a valve element
maximum permanent mass flow, at a maximum permanent cross section.

The sealing element DE can assume different positions in the valve stroke s. In the closed state (s=0 mm), the sealing element DE with the seat diameter dS sits on the valve seat VS. There is no flow through the valve in this state. The valve is sealing. The force F on the sealing element DE is calculated by the pressure surface formed by the seat diameter dS and the pressure difference on both sides of the sealing element.

When the valve stroke s is increased, the cross section passed through by the flow increases with a value x, approximating the line perpendicular to the valve seat surface up to the point of the seat diameter dS. The value x corresponds to the length of the shell face of a truncated cone. The flow direction is determined by the pressure difference via the sealing element DE.

This cross section of the truncated cone with the surface length x is effective as long as this area is smaller than the cross section of the bore dB. For larger valve strokes, the cross section of the bore dB is effective.

There are three parameters in the basic design, between which an optimum must always be found. The bore diameter dB defines the maximum possible mass flow. The minimum required stroke is then defined, at which the cross-sectional area between sealing element DE and valve seat VS is not yet effective. The valve seat angle α can be used to adjust the cross-sectional area in the stroke according to the requirements, while at the same time observing the condition of the effectiveness of the area of the bore diameter dB.

Selection parameters for the actuator are the required force of the sealing element DE in the closed state and the required valve stroke s, which corresponds to the magnetic stroke for a directly controlled valve.

The objective of pneumatics is to have a large effective valve stroke for the most accurate possible control in the widest possible range, with a maximum mass flow defining orifice with a diameter dB and a resulting large pneumatic force in the closed state.

The objective from the pneumatic side is in direct conflict with the choice of the actuator with the smallest possible installation space, in which the stroke must be as small as possible in order to obtain a sufficient force depending on the actuator stroke.

The most important requirement for selecting the actuator is (cf. no. 4 above): No noise generation—continuous and permanent release of a defined cross section.

When selecting the magnet, a switching magnet (with only two switching positions, e.g. that of an injector) can be excluded already from the "no noise" point of view. The first reason lies in the noise generated when switching. The second reason lies in that these magnets are designed for a high switching speed. On the one hand, this means that the resistance is low (rapid current increase when voltage is applied). This magnet would overheat if the current were continuously supplied. On the other hand, even if the resistance were higher, the magnetic stroke is too low. In the case of the switching magnet, the force decreases sharply at larger pole distances 5. The current required here to generate the force would be very high, thus creating the risk of overheating the coil. In order to prevent overheating, the magnet would have to be switched off temporarily, which would lead to a temporary closure of the bore. The consequence would be a larger bore and again also a larger magnet in order to be able to maintain the pneumatic forces in a larger bore.

In a linearization, the magnetic force is weakened in comparison to a switching magnet for small magnetic strokes, and increased for larger magnetic strokes. As a result, the total stroke of a magnet can be increased, the magnetic force can be adapted to the pneumatics, and the usable work can be increased. Linearization becomes difficult when the magnet must be pressure-balanced in the interior region and external tightness is to be ensured, and the construction mode of the magnet is to be small.

The actuation is usually via a "direct current". Since there is only one voltage from a battery in the vehicle, this voltage is converted into a direct current via pulse width modulation. If a linearized magnet is appropriately designed, a map in which the magnetic force is a function only of an applied current level can be generated at the actuator. If such a linearized magnet operates counter to a compression spring and the pneumatic forces, such a characteristic can be used to set up a magnet system in which the path is a direct function of the set current level. The frequency for pulse width modulation then determines the ripple of this DC current. Since the magnetic force is a direct function of the current, the current ripple generates an oscillating movement. As a result of the vibrations, the armature is moved relative to the counter bearing by way of dynamic friction. As a result, the friction in the system and thus the hysteresis of the function characteristic can be kept to a minimum.

The proportional magnet may be advantageous from a thermal point of view. In addition to the pressure and mass flow functions, the boundary condition is that the magnet is not thermally overloaded in a large ambient temperature range. The objective is that the pneumatics can be kept permanently open at a defined DC current without thermal overload. The coil resistance is low at low temperatures and increases at higher temperatures. Based on the ambient temperature, the applied electrical power further heats the coil resistance. The coil wire temperature must not exceed a certain value (e.g. 200° C.), otherwise the insulation of the coil wire could be damaged. On this basis, a maximum feedback-control range of the characteristic can be defined up to a current Imax, at which the complete mass flow can be set, while the coil is not thermally damaged.

After the pneumatic design of the magnet, another requirement for the valve is the operating mode, so that no damage occurs in the event of a fault, or emergency running properties are available. In this case, it is defined that in the event of a fault, if no electrical signal is present (failure of the electronics, damage to the wiring harness, plug, or blow-out of the coil), there must be no mass flow to the stack to prevent damage to the stack. The requirement from the above list of requirements (cf. no. 5 above) is that the valve must be closed when de-energized. Here, there are several possibilities for setting up such a valve, which differ in particular in terms of the direction of the magnetic force, the force of the compression spring, and the pneumatic force.

If one considers the next requirement (cf. no. 6 above), protection of the membrane on the anode side in the event of overpressure in the inlet region of the hydrogen metering valve, only the concepts in which there is no opening pressure by the pneumatics meet this requirement. This means that the valve element cannot be pushed open by the pneumatics by an increase in pressure. As a result, no medium, or only a small amount of medium, can enter the anode region, so that the membrane in the anode is protected from overpressure.

In view of the last two requirements (cf. nos. 7 and 8 above), the actuator must be in the region of the dry hydrogen in the inlet. On the low-pressure side, in addition to the metered hydrogen and nitrogen, there is also water vapor and deionized water. If these media were to be present in the actuator region, frozen water in the region of the moving parts could severely restrict or even preclude the feedback-controllability in the cold-starting range. As water expands during freezing, the magnet may be damaged by the volumetric expansion should water freeze in the region of the magnet.

These considerations lead to the following conclusion: The medium is fed in the region of the magnet. This protects the magnet from freezing. The pressure difference prevents the medium from making its way to the anode in the event of a fault. The electrical output can be limited and the diaphragm can be opened permanently as a result of the choice of the proportional magnet. As a result, the magnet can be operated almost silently, almost without mechanical stress on the valve element. The functional characteristic (correlation between mass flow m' and coil current) of such a valve is shown in FIG. 3. If there is a pressure difference between inlet and outlet and no electric current is applied, the valve element is closed by the pneumatic force. There is no mass flow at this point. If the electric current is increased, a balance of forces occurs at the point Iopen between pneumatic force, the force of the compression spring, and the magnetic force. The valve starts to open. With Imax, i.e. the maximum feedback-control range defined by the design, the minimum required mass flow at a defined pressure difference must be present at the valve in order to supply the anode at the full capacity of the fuel cell.

The objective of the precise feedback-control is an ideally minor opening flow Iopen, and the flattest possible characteristic curve to the point Imax, whereby the characteristic curve of the valve should also be adapted to the requirements of the fuel cell. This objective requires: an ideally large effective stroke in the region of the pneumatics, a magnet with an ideally large stroke and the greatest possible magnetic force, and moreover possibilities for shaping the characteristic curve in a balance of forces between pneumatic forces, magnetic forces and mechanical forces, which are functions of a path (stroke).

The issue with these valves is the target conflict between the relatively high pressures in the medium pressure line due to the relatively high required mass flows and the associated inlet orifice, the construction mode to meet the required functions and the limited installation space, including the requirement that the magnet must be pressure-balanced in the interior and sealed in relation to the environment.

The teachings of the present disclosure may provide a large feedback-control range for a purposefully accurate hydrogen metering and at the same time a high minimum quantity quality. The gradient ascends in this feedback-control range. The inlet orifice cross section should not be effective in the characteristic curve of the feedback-control range but only in the case of the maximum feedback-control current. This means that the characteristic curve above the control range should not be approximately horizontal.

Figure 4:
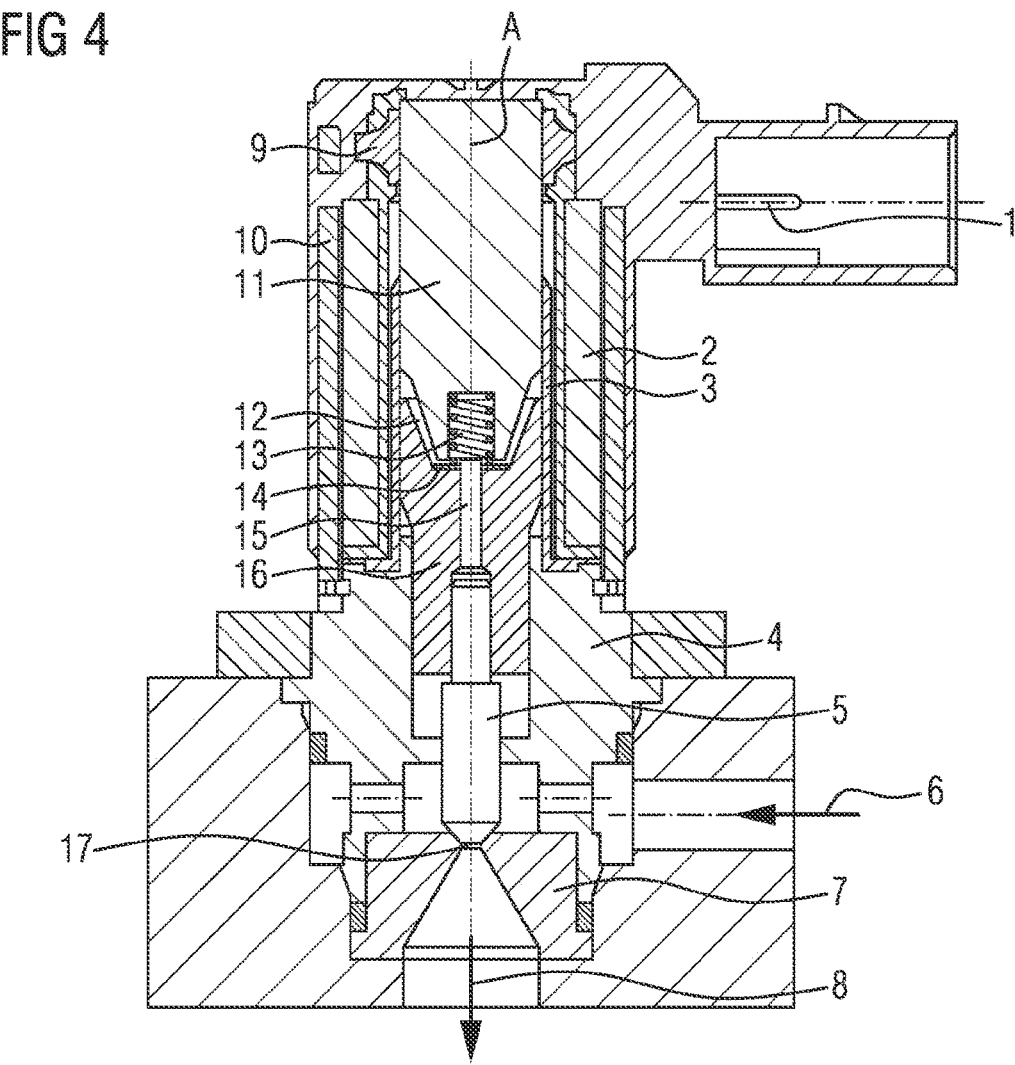
FIG. 4 shows an example device incorporating teachings of the present disclosure for the feedback-controllable metering of hydrogen to a fuel cell.

FIG. 4 shows an example device incorporating teachings of the present disclosure for the feedback-controllable metering of hydrogen to a fuel cell. In some embodiments, the device may be provided for the feedback-controllable metering of hydrogen in a hydrogen engine, for example for injecting into an induction pipe of the hydrogen engine.

The device shown has in particular a pneumatic region with a sealing element 17 and a valve seat 7, as well as an electromagnetic actuator with a pole core 11, an armature 16, and a coil 2. The pole core 11 conjointly with the armature 16 forms a double cone, both the pole core 11 and the armature 16 have surfaces which are inclined obliquely, or at a cone angle, relative to the axis. The armature 16 is coupled to the sealing element 17 via a centering pin 15 and a pin 5, so that an axial movement of the armature leads to a corresponding axial movement of the sealing element 17. The coil 2 is impinged with an electric current via a connection 1, and is separated by a sleeve 3 from the polarity core 11 and armature 16 in the interior of the magnetic force generating region 12. The sleeve 3 serves as a seal in relation to the environment. The device further comprises a housing 4 in which a lateral inlet 6 and a bottom outlet 8 for the hydrogen are provided. Provided in the upper region of the device are a yoke 9 and a pipe 10.

Figure 5:
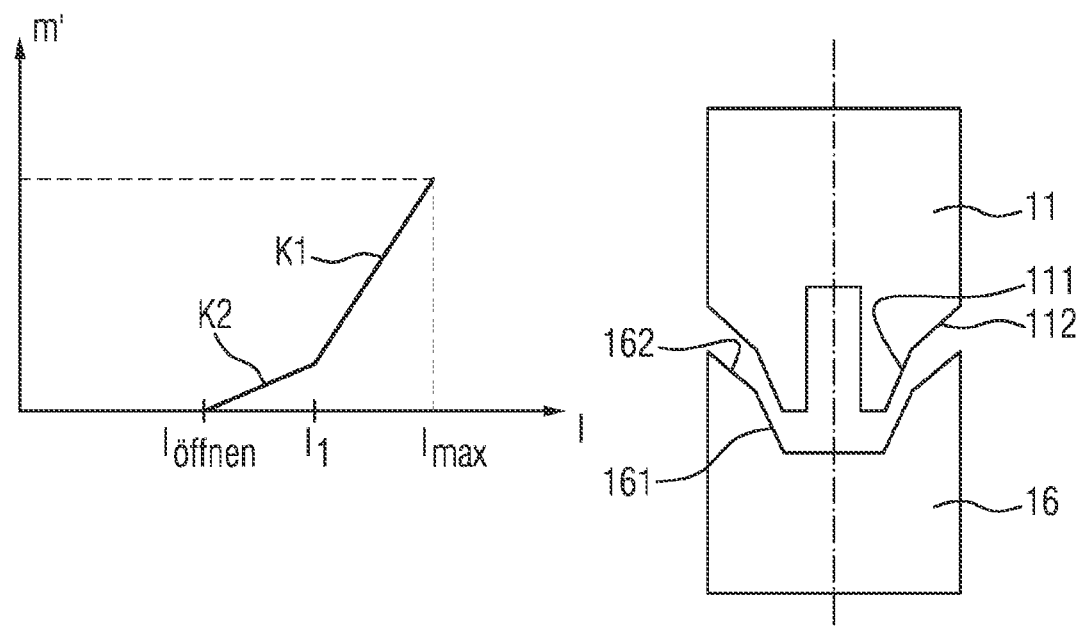
FIG. 5 shows a detailed view of a region for generating a magnetic force of an example device incorporating teachings of the present disclosure with an associated characteristic curve.

The teachings of the present allow deliberate shaping the magnetic force generating region 12. FIG. 5 shows a detailed view of a region for generating a magnetic force 12 of an example device incorporating teachings of the present disclosure with an associated characteristic curve. In this embodiment, the surface of the pole core 11 has a first pole core surface region 111 having a first pole core cone angle, and a second pole core surface region 112 having a second pole core cone angle. The surface of the armature 16 in an analogous manner comprises a first armature surface region 161 having a first armature cone angle, and a second armature surface region 162 having a second armature cone angle.

In this embodiment, the magnetic field lines are deflected differently for linearization, depending on the stroke of the magnet. This leads to the characteristic curve shown in the left part of FIG. 5, which has two characteristic curve segments K1 and K2 with different gradients. As a result, the characteristic curve can also be shaped in such a way that the feedback-control accuracy (gradient of the characteristic curve) is adapted to the requirements of the fuel cell. In this exemplary embodiment, segmentation of the characteristic curve is achieved by the gradation in the armature 16. In the range between Iopen and I1, the control accuracy is higher (flatter characteristic curve K2) than in the range between I1 and Imax (steeper characteristic curve K1).

Figure 6:
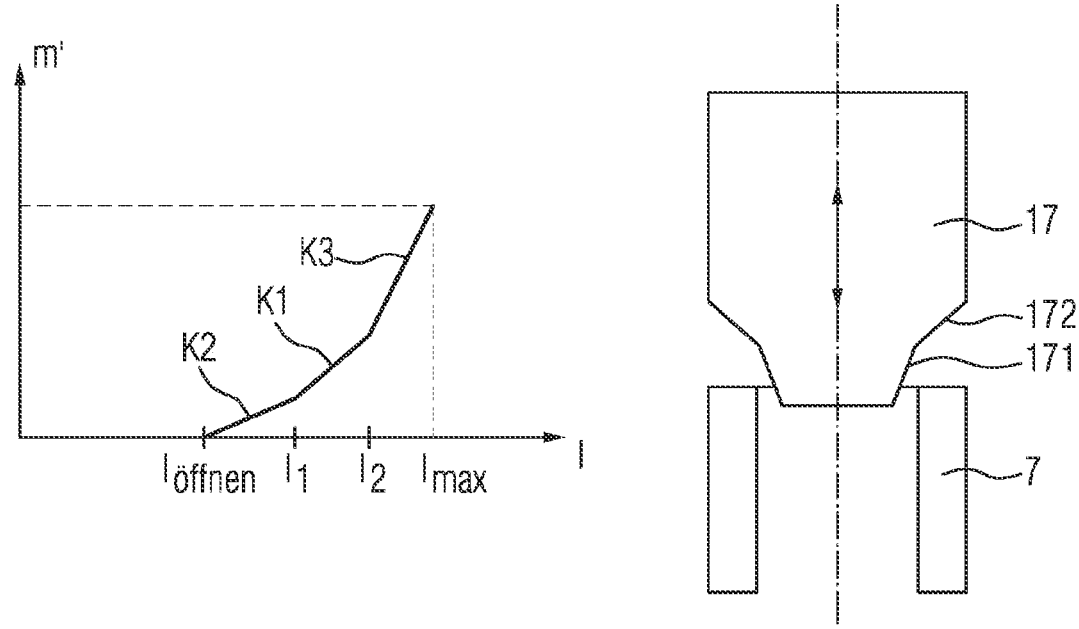
FIG. 6 shows a detailed view of a pneumatic region of an example device incorporating teachings of the present disclosure with the associated characteristic curve.

A similar or further gradation of the characteristic curve can be achieved with the design of the sealing element 17 in the pneumatic region of the device shown in FIG. 6. The sealing element 17 has a surface which tapers axially in the direction of the valve seat 7, having a first portion 171 having a first angle of inclination relative to the axis A, and a second portion 172 having a second angle of inclination relative to the axis A. In some embodiments, even more portions with individual inclination angles may be provided. The first portion 171 is located in the lower end portion of the sealing element 5 and is thus closer to the valve seat 7 than the second portion 172. Furthermore, the first angle of inclination is smaller than the second angle of inclination. When the valve is closed, the sealing element 17 is so deep in the valve seat that the surfaces lie tightly against one another.

When opening the valve, the change in size of the opening between the valve seat 7 and the sealing element 17 is determined with an increasing axial movement of the sealing element 17 upwards first by the portion 172. Once the coil current reaches a certain value and the sealing element 17 is positioned at the appropriate height, the change in size is determined further along by the portion 171. This corresponds to a steeper course of the characteristic curve owing to the smaller inclination angle. At the latest when the coil current reaches the maximum value Imax, the mass flow is equal to the minimum required mass flow. The gradation in the form of the sealing element 17 thus leads to a corresponding gradation in the form of the characteristic curve and in particular ensures that precise feedback-control is possible at both low and higher mass flows.

In combination with the gradation of the double cone explained in conjunction with FIG. 5, an additional gradation of the characteristic curve can thus be achieved. This can be recognized in the characteristic curve shown in the left part of FIG. 6, which has three characteristic curve portions K1, K2, K3 with different inclinations. A desired feedback-control accuracy (gradient of the characteristic curve) can thus be provided in various areas.

In some embodiments, the hydrogen metering valve is actuated by a pulse-width modulated voltage, the latter resulting in a direct current with a superimposed ripple. Ripple is defined by what is referred to as the chopper frequency, the frequency at which pulse width modulation is carried out. With this ripple, the armature 16 can be held in a defined motion in order to keep it in dynamic friction. The actuation preferably consists of a rectangular pulsed voltage with an adjustable duty cycle, which energizes a coil with a resistor and an inductance. The resistance is a function of the coil temperature.

In the range Iopen, the movement of the pneumatic element or sealing element 17 can lead to bouncing, as the pneumatic stroke is small, and the movement of the armature 16 can be larger than the pneumatic stroke. In order to prevent bouncing, the chopper frequency is purposefully increased in the range of opening. The basis for this is the electric current, which is determined by the electrical actuation at a known electrical voltage and duty cycle. This variable is used to determine the coil temperature in the electrical actuation, using the following formula:

$$R\_\vartheta = R\_20(1+\alpha \cdot \Delta \vartheta)$$

R20=resistance of the coil 2 at 20° C., α=temperature coefficient of copper, Δϑ=temperature difference to 20° C.

Based on the items of information pertaining to voltage, duty cycle and coil temperature, the chopper frequency is determined via a map in the electrical actuation, and the valve is actuated via these parameters. As a result, the movement of the magnet, and thus of the pin, is adjusted such that the movement of the magnet is smaller than the stroke of the valve. Bouncing can be prevented as a result.

What is claimed is:

1. A method for producing a device for the feedback-controllable metering of hydrogen, the method comprising:
   providing a valve seat in a body;
   providing a movable sealing element to seal against the valve seat;
   providing an electromagnetic actuator with a pole core, a solenoid, and an armature coupled to the sealing element, wherein the actuator moves the sealing element along an axis as a function of an electric current in the solenoid;
   wherein the pole core and the solenoid are fixed against movement in relation to the body;
   wherein the actuator is disposed between the pole core and the sealing element; and
   attaching a compression spring between the armature and the pole core onto a pin attached in the armature for centering the compression spring;
   wherein a surface of the pole core forms a conical extension having two separate conical profiles and having a cylindrical bore extending from the surface into the pole core;
   the compression spring is disposed within the cylindrical bore of the pole core and the pin extends from the armature into the cylindrical bore of the pole core within the compression spring;
   a surface of the armature forms a conical depression with two separate conical profiles; and
   the surface of the pole core and the surface of the armature conjointly form a double cone by interaction of the two respective separate conical profiles.

2. A device for the feedback-controllable metering of hydrogen, the device comprising:
   a body;
   a valve seat;
   a sealing element;
   an electromagnetic actuator having a pole core, a solenoid, and an armature coupled to the sealing element, wherein the actuator moves the sealing element along an axis as a function of an electric current in the solenoid;
   wherein the pole core and the solenoid are fixed against movement in relation to the body;
   wherein the actuator is disposed between the pole core and the sealing element;
   a compression spring attached between the armature and the pole core; and
   a pin attached in the armature for centering the compression spring;
   wherein a surface of the pole core forms a conical extension having two separate conical profiles and having a cylindrical bore extending from the surface into the pole core;
   the compression spring is disposed within the cylindrical bore of the pole core and the pin extends from the armature into the cylindrical bore of the pole core within the compression spring;
   a surface of the armature forms a conical depression with two separate conical profiles; and
   the surface of the pole core and the surface of the armature conjointly form a double cone by interaction of the two respective separate conical profiles.

3. The device as claimed in claim 2, wherein:
   the surface of the pole core has at least one first pole core surface region having a first pole core cone angle, and a second pole core surface region having a second pole core cone angle; and
   the surface of the armature has at least one first armature surface region having a first armature cone angle, and a second armature surface region having a second armature cone angle.

4. The device as claimed in claim 3, wherein:
   the first pole core surface region and the first armature surface region are in each case closer to the sealing element than the second pole core surface region and the second armature surface region; and
   the first pole core cone angle and the first armature cone angle are in each case smaller than the second pole core cone angle and the second armature cone angle.

5. The device as claimed in claim 3, wherein:
   the first pole core cone angle is equal to the first armature cone angle; and/or
   the second pole core cone angle is equal to the second armature cone angle.

6. The device as claimed in claim 2, further comprising a circuit for energizing the solenoid;
   wherein the circuit comprises a pulse width modulator with a variable frequency which is configured for varying the frequency as a function of voltage, duty cycle of the pulse width modulator, and the coil current.

7. The device as claimed in claim 2, wherein the sealing element has a surface which tapers axially in the direction of the valve seat and which has at least two portions each having a different angle of inclination relative to the axis.

8. The device as claimed in claim 2, having a characteristic curve representing a correlation between mass flow and coil current, which has at least two linear portions each with a different gradient.

9. The device as claimed in claim 2, wherein the electromagnetic actuator is disposed on a high-pressure side of the device.

* * * * *